US012734540B2

(12) United States Patent
Shi

(10) Patent No.: US 12,734,540 B2
(45) Date of Patent: Sep. 15, 2026

(54) THIN-WALLED TUBE FOR DISPENSING APPARATUS

(71) Applicant: Tekni-Plex, Inc., Wayne, PA (US)

(72) Inventor: Guangda Shi, Perrysburg, OH (US)

(73) Assignee: Tekni-Plex, Inc., Wayne, PA (US)

( * ) Notice: Subject to any disclaimer, the term of this patent is extended or adjusted under 35 U.S.C. 154(b) by 292 days.

(21) Appl. No.: 18/425,213

(22) Filed: Jan. 29, 2024

(65) Prior Publication Data

US 2025/0242372 A1 Jul. 31, 2025

(51) Int. Cl.
*B05B 11/10* (2023.01)
*B05B 15/30* (2018.01)

(52) U.S. Cl.
CPC .............. *B05B 15/30* (2018.02); *B05B 11/10* (2023.01); *B05B 11/1047* (2023.01)

(58) Field of Classification Search
CPC ...... B05B 15/30; B05B 11/1047; B05B 11/10
See application file for complete search history.

(56) References Cited

U.S. PATENT DOCUMENTS 6,276,566 B1 * 8/2001 Zaksenberg ........... B65D 23/14 222/78
7,718,132 B2 * 5/2010 Thomson ................ B05B 15/30 222/321.9
8,852,528 B2 * 10/2014 Thomson ................ B05B 15/30 222/321.9
2005/0236423 A1 * 10/2005 VanGordon ............. B05B 15/37 222/78
2007/0125805 A1 * 6/2007 Thomson ................ B05B 15/30 222/251
2008/0099513 A1 5/2008 Beun et al.
(Continued)

FOREIGN PATENT DOCUMENTS

EP 1933989 6/2008
FR 2754788 A1 4/1998
(Continued)

OTHER PUBLICATIONS

Written Opinion of the International Preliminary Examining Authority from the counterpart application issued on Feb. 5, 2025, Application No. PCT/US2024/013288.
(Continued)

*Primary Examiner* — Frederick C Nicolas
(74) *Attorney, Agent, or Firm* — POLSINELLI PC

(57) ABSTRACT

A dip tube for a dispensing apparatus, in particular an pump spray assembly for dispensing a liquid fragrance such as perfume or cologne. The dip tube is an extruded thin-walled polymer dip tube configured to provide substantial invisibility when disposed in a liquid fragrance product. In contrast to the prior art that aims to match the refractive index of the dip tube polymer and perfume, the present invention enables use of polymers that having a substantially different refractive index than that of the liquid fragrance, and instead provide a thin-walled tube that is rendered substantially invisible in the liquid fragrance. In one embodiment, the difference in refractive index is 0.04 or more, and in one embodiment is in a range of 0.045 to 0.20. This is the opposite approach taken in the prior art, which relied on refractive index matching, and substantially zero difference.

16 Claims, 2 Drawing Sheets

(56) References Cited

U.S. PATENT DOCUMENTS

| | | | | |
|---|---|---|---|---|
| 2021/0206891 | A1 | 7/2021 | Heindel et al. | |
| 2022/0170575 | A1 | 6/2022 | Heindel et al. | |
| 2024/0026096 | A1* | 1/2024 | Wang | C08K 7/26 |

FOREIGN PATENT DOCUMENTS

| | | | |
|---|---|---|---|
| WO | 2007/047168 | A2 | 4/2007 |
| WO | 2022/202705 | A1 | 9/2022 |
| WO | 2024/020518 | A1 | 1/2024 |

OTHER PUBLICATIONS

International Search Report and Written Opinion in related international application PCT/US2024/013288 issued on Aug. 19, 2024.

The Notification of Transmittal of the International Preliminary Report of Patentability dated on Sep. 29, 2025 issued in PCT Patent Application No. PCT/US2024/013288 (15 pages).

* cited by examiner

THIN-WALLED TUBE FOR DISPENSING APPARATUS

FIELD OF THE INVENTION

This application relates to a dip tube for a dispensing apparatus, and in particular to a liquid fragrance dispensing apparatus having a thin-walled dispensing tube that is substantially invisible in the liquid fragrance product.

BACKGROUND OF THE INVENTION

Spray bottles are in widespread use for dispensing liquid products, such as a perfume or fragrance, as an atomized spray of the liquid fragrance from the top end of the container. The dispensing apparatus comprises a manually operated pump and nozzle disposed in or above a cap on the top end of the container, and a dip tube connected to the pump and nozzle that extends down into the liquid fragrance to dispense (via suction) the liquid out the nozzle. The bottle is generally made of glass, and makers of high end (expensive) perfumes prefer that the dip tube not be visible to the consumer.

The prior art solution to creating an invisible dip tube is to provide a dip tube of a polymer having a refractive index that substantially matches the refractive index of the liquid fragrance, typically 1.38 to 1.41. The preferred polymer is a fluoropolymer such as extruded EFEP (made from ethylene, tetrafluoroethylene and hexafluoropropylene). Such polymers are commercially available (for example, RP-5000 from Daikin) having a lower refractive index than most other polymers that matches well with the refractive index of the perfume (1.38-1.41).

However, such polymers contain fluorine which is classified as a PFAS, and many consumer product companies are now trying to eliminate use of PFAS in all their products based on consumer or regulatory demands that disfavor use of such polymers.

It would thus be desirable to provide a dip tube for a dispensing apparatus that avoids use of a fluoropolymer, while maintaining invisibility of such dip tube.

Another polymer that has been suggested for use in a perfume dip tube, is silicone. Silicone has a good match to the refractive index of perfume, but it is soft, sticky and difficult to handle in the extrusion molding process and while assembling it to the pump mechanism. Thus, silicone is not a good substitute.

Other polymers previously used in perfume application are polypropylene and polyethylene, but they lack the desired appearance of invisibility.

SUMMARY OF THE INVENTION

The present invention is an extruded thin-walled dip tube configured to provide substantial invisibility when disposed in a liquid fragrance product. In contrast to the prior art that aims to match the refractive index of the dip tube polymer and liquid fragrance (perfume), the present invention enables use of polymers that having a substantially different refractive index than that of the liquid fragrance, and instead provide a thin-walled tube that is rendered substantially invisible in the liquid fragrance.

In one embodiment, the difference in refractive index is 0.04 or more, and in one embodiment the difference is in a range of 0.045 to 0.20. This is the opposite approach taken in the prior art, which relied on refractive index matching, and substantially zero difference.

In one embodiment, the wall thickness of the dip tube is no greater than 6 mils (0.152 mm), and in one embodiment is in a range of 2 mils (0.051 mm) to 5 mils (0.127 mm). This is substantially different than the prior art fluoropolymer dip tubes, which are typically 6 times greater in thickness, e.g., 13 mils.

In one embodiment, a dip tube configured to provide substantial invisibility when disposed in a liquid fragrance in a glass container, comprising:

- a non-fluoropolymer extruded thin-walled polymer dip tube having a substantially different refractive index than that of the liquid fragrance, wherein the difference in refractive index is 0.04 or more,
- and wherein the wall thickness of the dip tube is no greater than 6 mils (0.152 mm) to render the thin-walled polymer dip tube substantially invisible in the liquid fragrance in the glass container.

In one embodiment, the difference in refractive index is in a range of 0.045 to 0.20.

In one embodiment, the wall thickness of the dip tube is in a range of 2 mils (0.051 mm) to 5 mils (0.127 mm).

In one embodiment, the outer diameter of the dip tube is in a range of 1.5 mm to 2.5 mm.

In one embodiment, the difference in refractive index is compared to a liquid fragrance having a refractive index in a range of 1.38 to 1.41.

In one embodiment, the extruded polymer has refractive index in a range of 1.45 to 1.48.

In one embodiment, the extruded polymer comprises at least 90 percent by weight of polymethylpentene (PMP).

In one embodiment, the extruded polymer comprises polymethylpentene (PMP) having a refractive index in a range of 1.45 to 1.48, the wall thickness of the dip tube is in a range of 2 mils (0.051 mm) to 5 mils (0.127 mm), and the outer diameter of the dip tube is in a range of 1.5 to 2.5 mm.

In one embodiment, the extruded polymer comprises at least 95 percent by weight of polymethylpentene (PMP).

In one embodiment, the extruded polymer comprises polymethylpentene (PMP) having a flexural modulus of greater than 29,000 psi.

In one embodiment, the extruded polymer comprises polymethylpentene (PMP) having a light transmittance of greater than 92%.

In one embodiment, the extruded polymer comprises cyclic olefin copolymer having a refractive index in a range of 1.52-1.56, the wall thickness of the dip tube is in a range of 2 mils (0.051 mm) to 5 mils (0.127 mm), and the outer diameter of the dip tube is in a range of 1.5 to 2.5 mm.

In one embodiment, the extruded polymer comprises cyclic olefin copolymer having a refractive index in a range of 1.52-1.56, the wall thickness of the dip tube is in a range of 2 mils (0.051 mm) to 5 mils (0.127 mm), and the outer diameter of the dip tube is in a range of 1.5 to 2.5 mm.

In another embodiment, a dispensing apparatus for dispensing an spray of a liquid fragrance from a glass container holding the liquid fragrance via a manual pump assembly connected to the container, the pump assembly including a dip tube having a distal end that extends into the liquid fragrance and a proximal end connected to a nozzle spray and pump for dispensing the spray of liquid fragrance, wherein the dip tube comprises:

- an extruded polymer thin-walled dip tube configured to provide substantial invisibility when disposed in a liquid fragrance in a glass container.
- the extruded polymer dip tube comprising a non-fluoropolymer having a substantially different refractive index than that of the liquid fragrance, wherein the difference in refractive index is 0.04 or more, and wherein the wall thickness of the extruded polymer dip tube is no greater than 6 mils (0.152 mm) to render the thin-walled dip tube substantially invisible in the liquid fragrance in the glass container.

In another embodiment, the difference in refractive index is compared to a liquid fragrance having a refractive index in a range of 1.38 to 1.41.

In another embodiment, the extruded polymer comprises at least 90 percent by weight of polymethylpentene (PMP) having a refractive index in a range of 1.45 to 1.48, the wall thickness of the dip tube is in a range of 2 mils (0.051 mm) to 5 mils (0.127 mm), and the outer diameter of the dip tube is in a range of 1.5 to 2.5 mm.

In another embodiment, the extruded polymer comprises polymethylpentene (PMP) having a flexural modulus of greater than 29,000 psi and a light transmittance of greater than 92%.

In another embodiment, the extruded polymer comprises at least 95 percent by weight of polymethylpentene (PMP).

In another embodiment, the dip tube is substantially invisible when disposed in the liquid fragrance in a glass container configured to hold 1 to 8 fluid ounces of the liquid fragrance, and the refractive index of the glass is in a range of 1.5 to 1.6.

In another embodiment, the dip tube is substantially invisible when disposed in the liquid fragrance in a glass container configured to hold 1 to 8 fluid ounces of the liquid fragrance, and the refractive index of the glass is in a range of 1.5 to 1.6.

BRIEF DESCRIPTION OF THE DRAWINGS

For a better understanding of the invention, and to show how the same may be carried into effect, reference will now be made, by way of example to the accompanying drawings, in which.

DETAILED DESCRIPTION

Figure 1:
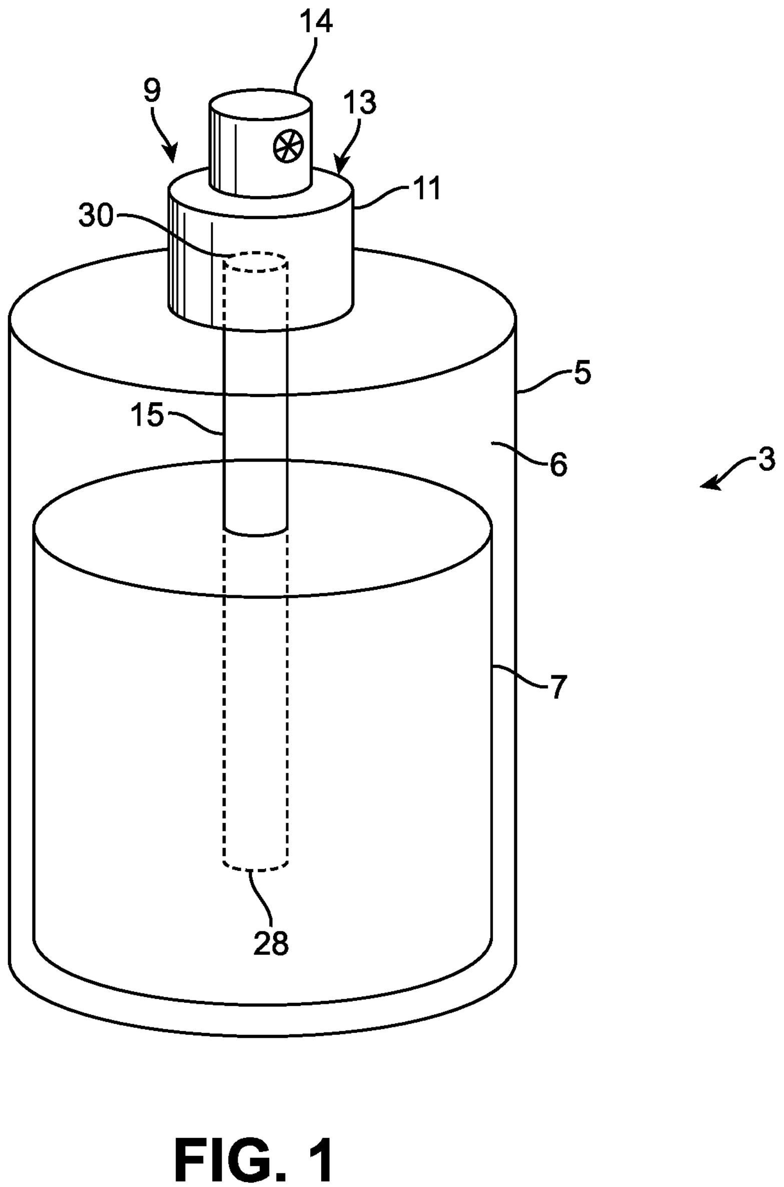
FIG. 1 is a schematic illustration of one embodiment of the invention, comprising a dispensing apparatus with a dip tube extending from a pump assembly down into a chamber of a glass container holding a liquid fragrance product, for extracting and dispensing the fragrance as an spray out the top end of the container.

Reference will now be made in detail to various embodiments of the present invention, examples of which are illustrated in the accompanying drawings, wherein like reference numerals refer to the like elements throughout.

Figure 2:
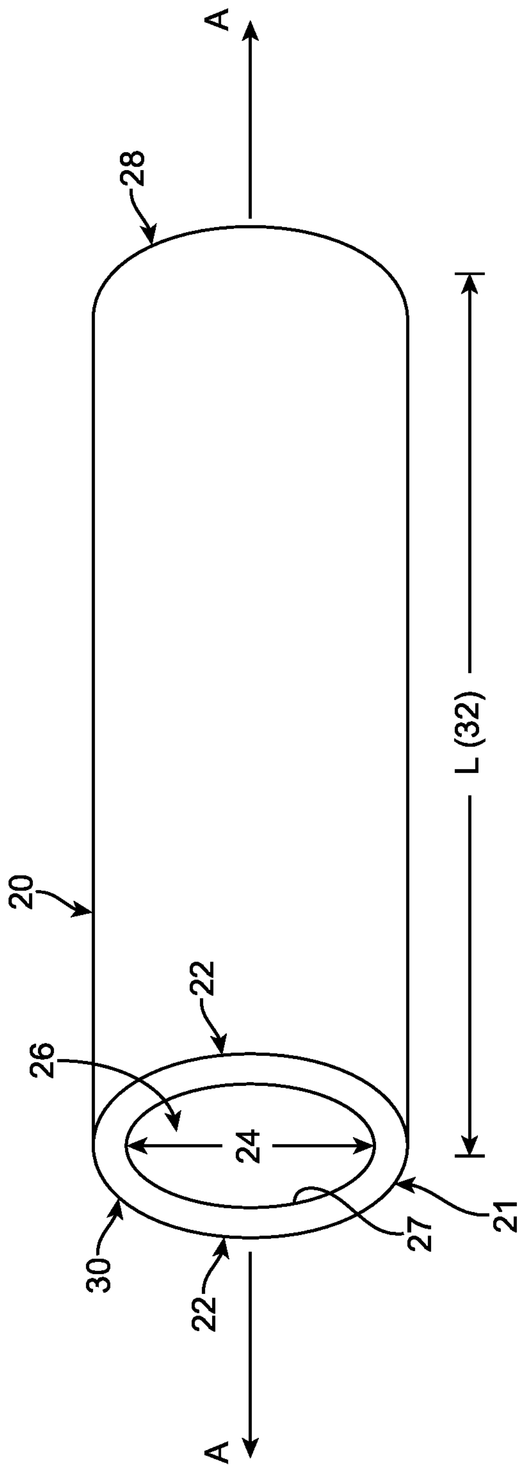
FIG. 2 is a schematic illustration of one embodiment of a dip tube as shown in FIG. 1.

FIGS. 1-2 illustrate a monolayer dip tube 15 according to one embodiment of the invention. The dip tube 15 is part of a dispenser assembly 9 for dispensing a liquid fragrance from a glass bottle or container 5. The glass container 5 has an interior chamber 6 for holding a liquid fragrance 7, and an open top end for dispensing the liquid fragrance from the container. A dispenser assembly 9 encloses the open top end of the chamber and includes a cap 11 and a pump assembly 13. The dip tube 15 forms a part of the pump assembly 13 and extends from the pump down into the liquid fragrance 7 held in the chamber. The pump and dip tube allows the fragrance to be drawn out of the chamber via suction by a user activating (pushing on) a nozzle 14 at the upper end of the pump assembly to dispense a spray of the liquid fragrance out the nozzle 14.

The dip tube 15 comprises an elongated thin-walled cylindrical tube body 20 having a tubular sidewall 21 surrounding a central axial tubular bore 26, that extends the full axial length (L) 32 of the tube and is open at both a distal end 28 and a proximal end 30. The tube has an inner diameter (ID) 24 for admitting the liquid product 3 into the tube by suction via the open distal end 28, and an open proximal end 30 for passing the liquid product (fragrance 7) through the tube as liquid is being drawn into the tube at the distal end. The proximal end 30 of the dip tube is fluidly connected to the pump assembly 13, which applies the suction force to draw liquid into the distal end 28 of the tube (and extract the liquid out the proximal end 30 of the tube) to be dispensed as an liquid fragrance product.

The dip tube 15 is a continuous tubular body of extruded polymer material (as defined herein) extending axially along the entire length (L) 32 of the tube, as shown in the lengthwise view of FIG. 2. Typically, the tubular body 20 is substantially cylindrical, extending some length L along an elongated tube axis A, and having a total sidewall of thickness T extending from an inner tube diameter (ID) 24 to an outer tube diameter (OD) 22. The ID is sized, and the polymer material is selected, to permit liquid to be drawn into the tubular body by suction action (via the pump 13). Preferably no coating is required on the inner surface 27 of the bore 26 to provide the desired suction action. The OD is sized, and the polymer materials are selected to provide sufficient flexural strength for rigidity and desirable handling characteristics to the tube for required assembly to the pump assembly (at the proximal end 30) and the desired use/application (non-reactive to the fragrance and able to withstand repeated pumping actions at the proximal end 30) for dispensing the fragrance. Preferably the extruded polymer tube 20 has a flexural modulus at or greater than about 29,000 psi (pounds per square inch). Typically, the tubing is extruded in a continuous extrusion process (melted at an elevated temperature and extruded though a tubular die) to form an extended length of tubing. Individual dip tubes may then be cut from the length of tubing at desired lengths.

The dip tube 15 according to the present invention is an extruded thin-walled dip tube configured to provide substantial invisibility when disposed in a liquid fragrance product. In contrast to the prior art that aims to match the refractive index of the dip tube polymer and perfume, the present invention enables use of polymers that having a substantially different refractive index than that of the liquid fragrance, and instead provide a thin-walled tube that is rendered substantially invisible in the liquid fragrance.

In one embodiment, the difference in refractive index is 0.04 or more, and in one embodiment is in a range of 0.04 to 0.20. This is the opposite approach taken in the prior art, which relied on refractive index matching, and substantially zero difference.

In one embodiment, the wall thickness of the dip tube is no greater than 6 mils (0.152 mm); in one embodiment the wall thickness is in a range of 2 mils (0.051 mm) to 6 mils (0.152 mm), and preferably may be 2 mils or less. This is substantially different than the prior art fluoropolymer dip tubes, which are typically 6 times greater in thickness, e.g., 13 mils.

In one embodiment, the tube has an outer diameter in a range of 1.56-1.6 mm, an inner diameter in a range of 1.46-1.49 mm, and a tube sidewall thickness in a range of 0.03-0.07 mm.

In one embodiment, the dip tube polymer is polymethylpentene (PMP). One such suitable PMP polymer is known as TPX and is available from Mitsai Chemicals America, Inc., Rye Brook, NY. Preferred properties of the PMP include a flexural modulus >29,000 psi, a refractive index of approximately 1.46, and a light transmittance >92%.

In another embodiment, the dip tube polymer is a polyolefin material. The polyolefin material may comprise, for example, a polypropylene material comprising one or more of a polypropylene homopolymer and a polypropylene copolymer, or a polyethylene material comprising one or more of a polyethylene homopolymer and a polyethylene copolymer.

In another embodiment, the dip tube polymer is a cyclic olefin copolymer (COC). The cyclic olefin copolymer (COC) is typically produced by chain copolymerization of a cyclic monomer with ethene, or by ring-opening metathesis polymerization of a cyclic monomer followed by hydrogenation. In one example, the cyclic olefin copolymer is produced by chain copolymerization with ethene of a cyclic monomer comprised of one or more of 8,9,10-trinorborn-2-ene and 1,2,3,4,4a,5,8,8a-octahydro-1,4:5,8-dimethanonaphthalene, or by ring-opening metathesis polymerization of a cyclic monomer followed by hydrogenation.

The polymer materials (from which the dip tube is made) as defined above are preferably "nonreactive" meaning they are non-polar and otherwise lacking chemical functionality (functional groups) that would interact with the fragrance, and "contaminant free" meaning they do not contain more than insignificant amounts of potentially unwanted materials (typically less than about 0.5%, and preferably less than about 0.2%, by weight) and/or prevent leaching or leaking of unwanted materials such as plasticizers, catalysts, monomers, metals, salts, ions or other substances that would substantially alter and/or are potentially unwanted in a fragrance.

The polymer material for the dip tube 15 as defined herein comprises at least 90% by weight (of the PMP or alternative polymers defined herein), more preferably at least 95%, and still more preferably at least 99% of the dip tube.

The glass container 5 can be of various sizes and shapes configured for use with the dip tube of the present invention. A typical fragrance container for use in the present invention would have a chamber sized to hold a quantity of liquid fragrance in a range of 1 oz. to 8 oz (fluid ounces). The refractive index of the glass container wall (through which the dip tube in the fragrance is viewed from the exterior of the container), is preferably in a range of 1.5 to 1.6.

The dip tube is configured to be substantially invisible to the naked eye of a human observer from the exterior of the container through which the dip tube in the fragrance is viewed. A suitable test for determining substantial invisibility is by observing a dip tube in a rectangular glass container while the dip tube is immersed in ethanol, wherein the refractive index of the glass container wall (through which the dip tube in the fragrance is viewed from the exterior of the container) is preferably in a range of 1.5 to 1.6.

The foregoing description is intended to illustrate and not limit the scope of the invention; those skilled in the art will realize that equivalents thereof are contemplated by the description above and that changes and modifications may be made thereto without departing from the invention, all such equivalents, changes and modifications falling within the scope of the claims hereof.

The invention claimed is:

1. In combination, a dip tube and a liquid fragrance, the dip tube configured to provide substantial invisibility when disposed in the liquid fragrance in a glass container, the dip tube comprising a non-fluoropolymer extruded thin-walled polymer dip tube having a substantially different refractive index than that of the liquid fragrance, wherein the difference in refractive index is 0.04 or more and wherein the liquid fragrance has a refractive index in a range of 1.38 to 1.41, and wherein the dip tube has a wall thickness of no greater than 6 mils (0.152 mm) to render the thin-walled polymer dip tube substantially invisible in the liquid fragrance in the glass container.

2. The combination of claim 1, wherein the difference in refractive index is in a range of 0.045 to 0.20.

3. The combination of claim 2, wherein the wall thickness of the dip tube is in a range of 2 mils (0.051 mm) to 5 mils (0.127 mm).

4. The combination of claim 3, wherein the dip tube has an outer diameter in a range of 1.5 mm to 2.5 mm.

5. The combination of claim 2, wherein the extruded polymer comprises at least 90 percent by weight of polymethylpentene (PMP).

6. The combination of claim 5, wherein the extruded polymer comprises at least 95 percent by weight of polymethylpentene (PMP).

7. The combination of claim 6, wherein the extruded polymer comprises polymethylpentene (PMP) having a flexural modulus of greater than 199.95 MPa (29,000 psi).

8. The combination of claim 6, wherein the extruded polymer comprises polymethylpentene (PMP) having a light transmittance of greater than 92%.

9. The combination of claim 1, wherein the extruded polymer has refractive index in a range of 1.45 to 1.48.

10. The combination of claim 1, wherein the extruded polymer comprises polymethylpentene (PMP) having a refractive index in a range of 1.45 to 1.48, the wall thickness of the dip tube is in a range of 2 mils (0.051 mm) to 5 mils (0.127 mm), and the outer diameter of the dip tube is in a range of 1.5 to 2.5 mm.

11. The combination of claim 1, wherein the extruded polymer comprises cyclic olefin copolymer having a refractive index in a range of 1.52-1.56, the wall thickness of the dip tube is in a range of 2 mils (0.051 mm) to 5 mils (0.127 mm), and the outer diameter of the dip tube is in a range of 1.5 to 2.5 mm.

12. In combination, a dispensing apparatus and a liquid fragrance, the dispensing apparatus for dispensing a spray of the liquid fragrance from a glass container holding the liquid fragrance via a manual pump assembly connected to the container, the pump assembly including a dip tube having a distal end that extends into the liquid fragrance and a proximal end connected to a nozzle spray of the manual pump assembly for dispensing the spray of liquid fragrance, wherein the dip tube comprises:

an extruded polymer thin-walled dip tube configured to provide substantial invisibility when disposed in the liquid fragrance in a glass container, the extruded polymer dip tube comprising a non-fluoropolymer having a substantially different refractive index than that of the liquid fragrance, wherein the difference in refractive index is 0.04 or more, wherein the liquid fragrance has a refractive index in a range of 1.38 to 1.41 and wherein the extruded polymer dip tube has a wall thickness of no greater than 6 mils (0.152 mm) to render the thin-walled dip tube substantially invisible in the liquid fragrance in the glass container.

13. The combination of claim 12, wherein the extruded polymer comprises at least 90 percent by weight of polymethylpentene (PMP) having a refractive index in a range of 1.45 to 1.48, the dip tube has a wall thickness in a range of 2 mils (0.051 mm) to 5 mils (0.127 mm), and the outer diameter of the dip tube is in a range of 1.5 to 2.5 mm.

14. The combination of claim 13, wherein the extruded polymer comprises polymethylpentene (PMP) having a flexural modulus of greater than 199.95 MPa (29,000 psi) and a light transmittance of greater than 92%.

15. The combination of claim 14, wherein the extruded polymer comprises at least 95 percent by weight of polymethylpentene (PMP).

16. The combination of claim 15, wherein the glass container is configured to hold 29.57 to 236.59 cubic centimetres (1 to 8 fluid ounces) of the liquid fragrance, and the glass container has a refractive index in a range of 1.5 to 1.6.

* * * * *